US010766529B2

(12) United States Patent
Kong et al.

(10) Patent No.: US 10,766,529 B2
(45) Date of Patent: Sep. 8, 2020

(54) COWL CROSS BAR FOR VEHICLE

(71) Applicants: Hyundai Motor Company, Seoul (KR); Kia Motors Corporation, Seoul (KR)

(72) Inventors: Byung Seok Kong, Gunpo-si (KR); Jung Yoon Jang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 86 days.

(21) Appl. No.: 16/185,520

(22) Filed: Nov. 9, 2018

(65) Prior Publication Data
US 2019/0077453 A1 Mar. 14, 2019

Related U.S. Application Data

(62) Division of application No. 15/341,252, filed on Nov. 2, 2016, now Pat. No. 10,155,536.

(30) Foreign Application Priority Data

Jun. 1, 2016 (KR) .......................... 10-2016-0067929

(51) Int. Cl.
*B60J 7/00* (2006.01)
*B62D 7/22* (2006.01)
(Continued)

(52) U.S. Cl.
CPC ........... *B62D 7/224* (2013.01); *B62D 25/145* (2013.01); *B62D 27/02* (2013.01); *B62D 29/008* (2013.01);
(Continued)

(58) Field of Classification Search
CPC ....... H01L 2924/00; H01L 2224/48247; H01L 2224/48472; H01L 2924/00014;
(Continued)

(56) References Cited

U.S. PATENT DOCUMENTS 5,282,637 A * 2/1994 McCreadie .............. B62D 1/16
248/224.61
6,110,037 A 8/2000 Yoshinaka
(Continued)

FOREIGN PATENT DOCUMENTS

KR 10-2001-0058928 A 7/2001
KR 10-2003-0004733 A 1/2003
(Continued)

*Primary Examiner* — Kiran B Patel
(74) *Attorney, Agent, or Firm* — Morgan, Lewis & Bockius LLP

(57) ABSTRACT

A cowl cross bar for a vehicle comprising a main cross bar disposed in front of a driver's seat in a transverse direction of the vehicle, a sub-cross bar disposed in front of a passenger seat in the transverse direction of the vehicle, and a center supporter configured to couple the main cross bar and the sub-cross bar to each other such that diametric centers thereof are disposed eccentrically relative to each other, the center supporter may include a main center support bracket provided with a connector to which a longitudinal end of the sub-cross bar is fixed, and a sub-center support bracket fixed to the main center support bracket, and having an insert hole through which a longitudinal end of the main cross bar is fixed to the sub-center support bracket.

7 Claims, 8 Drawing Sheets

(51) Int. Cl.
  *B62D 25/14* (2006.01)
  *B62D 27/02* (2006.01)
  *B62D 29/00* (2006.01)
(52) U.S. Cl.
  CPC ... *B60Y 2410/121* (2013.01); *B60Y 2410/124* (2013.01)
(58) Field of Classification Search
  CPC . B60P 3/125; B29C 66/71; G09F 3/14; H04Q 11/0005; G11B 5/6005; G11B 5/6082
  See application file for complete search history.

(56) References Cited

U.S. PATENT DOCUMENTS

| | | | |
|---|---|---|---|
| 6,250,678 B1 | 6/2001 | Yoshinaka et al. | |
| 6,523,878 B2 * | 2/2003 | Scheidel | B62D 25/145 180/90 |
| 6,932,410 B2 * | 8/2005 | DeLong | B60K 37/00 296/72 |
| 7,216,927 B2 * | 5/2007 | Luo | B62D 25/145 296/193.02 |
| 7,320,290 B2 | 1/2008 | Watanabe | |
| 7,607,691 B2 * | 10/2009 | Arnold | B29C 33/52 280/751 |
| D691,523 S * | 10/2013 | Waugh | D12/159 |
| 2002/0056982 A1 * | 5/2002 | Brownlee | B62D 1/16 280/779 |
| 2005/0134090 A1 | 6/2005 | Kring et al. | |
| 2008/0048470 A1 * | 2/2008 | Vican | B62D 25/145 296/193.02 |
| 2008/0054682 A1 | 3/2008 | Ellison et al. | |
| 2008/0122265 A1 * | 5/2008 | Meier | B62D 25/145 296/204 |
| 2009/0033126 A1 * | 2/2009 | Mullen | B60K 37/00 296/193.02 |
| 2009/0174223 A1 * | 7/2009 | Penner | B60K 37/00 296/193.02 |
| 2010/0052366 A1 * | 3/2010 | Schmieder | B62D 25/145 296/193.02 |
| 2010/0327627 A1 * | 12/2010 | Leanza | B62D 25/145 296/190.01 |
| 2013/0026798 A1 | 1/2013 | Meier | |
| 2013/0057026 A1 | 3/2013 | Kim et al. | |
| 2013/0186230 A1 * | 7/2013 | Fujiwara | B60R 21/09 74/560 |
| 2013/0241235 A1 | 9/2013 | Baudart et al. | |
| 2013/0249201 A1 * | 9/2013 | Fujiwara | B60R 21/045 280/752 |
| 2014/0125086 A1 * | 5/2014 | Da Costa Pito | B62D 25/145 296/72 |
| 2014/0333094 A1 | 11/2014 | Matsushita et al. | |
| 2015/0145237 A1 * | 5/2015 | Morita | B62D 25/147 280/779 |
| 2015/0183469 A1 * | 7/2015 | Kong | B62D 1/16 296/193.02 |
| 2015/0344080 A1 * | 12/2015 | Davos | B62D 29/001 296/205 |

FOREIGN PATENT DOCUMENTS

| | | |
|---|---|---|
| KR | 10-2006-0005787 A | 1/2006 |
| KR | 10-2012-0040548 A | 4/2012 |
| KR | 10-2013-0026262 A | 3/2013 |
| KR | 10-1534730 B1 | 7/2015 |

* cited by examiner

COWL CROSS BAR FOR VEHICLE

CROSS-REFERENCE TO RELATED APPLICATION

The present application is a Divisional of U.S. patent application Ser. No. 15/341,252, filed Nov. 2, 2016, which claims priority to Korean Patent Application No. 10-2016-0067929, filed Jun. 1, 2016, the entire contents of which applications are incorporated herein for all purposes by these references.

BACKGROUND OF THE INVENTION

Field of the Invention

The present disclosure relates to a cowl cross bar for a vehicle. More particularly, it relates to a cowl cross bar for a vehicle which is configured such that the coupling structure between a main cross bar in front of a driver's seat and a sub-cross bar in front of a passenger seat is improved, whereby the stiffness of the cowl cross bar can be enhanced.

Description of Related Art

Generally, a cowl cross bar is provided in the front of a vehicle to support a steering apparatus such that the steering apparatus is fixed to a vehicle body. The cowl cross bar is directly mounted to the vehicle body in such a manner that cowl cross bar is disposed perpendicular to a steering column of the steering apparatus and oriented to extend in a transverse direction of the vehicle.

The cowl cross bar has a structure capable of absorbing vibration transmitted from the steering apparatus and resisting the vibration. In addition, the cowl cross bar is configured to increase the stiffness so as to enhance characteristics of resisting vibration transmitted from a steering wheel.

A conventional cowl cross bar is configured such that a main cross bar disposed in front of the driver's seat is coupled, by a center support bracket, with a sub-cross bar disposed in front of the passenger seat. The main cross bar and the sub-cross bar may be eccentrically disposed depending on a design by taking into account the layout of internal components of the vehicle.

However, the conventional cowl cross bar is problematic in that the stiffness thereof is reduced because of the eccentricity between the main cross bar and the sub-cross bar, whereby crashworthiness and vibration characteristics deteriorate.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a cowl cross bar for a vehicle which is configured such that the optimal coupling structure between a main cross bar in front of a driver's seat and a sub-cross bar in front of a passenger seat is embodied depending on an eccentric rate between the main cross bar and the sub-cross bar, whereby the stiffness of the cowl cross bar can be effectively enhanced.

According to various aspects of the present invention, a cowl cross bar for a vehicle may include a main cross bar disposed in front of a driver's seat in a transverse direction of the vehicle, a sub-cross bar disposed in front of a passenger seat in the transverse direction of the vehicle, and a center supporter configured to couple the main cross bar and the sub-cross bar to each other such that diametric centers thereof are disposed eccentrically relative to each other, and the center supporter may include a main center support bracket provided with a connector to which a longitudinal end of the sub-cross bar is fixed, and a sub-center support bracket fixed to the main center support bracket, and having an insert hole through which a longitudinal end of the main cross bar is fixed to the sub-center support bracket.

The main cross bar and the sub-cross bar may be disposed such that a sum of a radius of the main cross bar and a radius of the sub-cross bar is less than a distance between the diametric center of the main cross bar and the diametric center of the sub-cross bar.

The connector may protrude in a conical shape from the main center support bracket, the longitudinal end of the sub-cross bar may have an expanded pipe shape, and the connector may be inserted into and fixed to the longitudinal end of the sub-cross bar.

A bonding flange may be provided around the insert hole, and the longitudinal end of the main cross bar that is inserted into the insert hole may be enclosed by and fixed to the bonding flange.

An edge of the main center support bracket may be fixed to a sub flange of the sub-center support bracket, and the connector and the insert hole are disposed to be stepped from each other.

According to various aspects of the present invention, a cowl cross bar for a vehicle may include a main cross bar disposed in front of a driver's seat in a transverse direction of the vehicle, a sub-cross bar disposed in front of a passenger seat in the transverse direction of the vehicle, and a center support bracket configured to couple the main cross bar and the sub-cross bar to each other such that diametric centers thereof are disposed eccentrically relative to each other, in which the center support bracket may have a cross-sectional structure enclosing a longitudinal end of the main cross bar, and may include a main bonding part and a main lower flange that are fixed to an outer circumferential surface of the main cross bar, and a sub-side flange fixed to an outer circumferential surface of the sub-cross bar.

The main cross bar and the sub-cross bar may be disposed such that a distance between the diametric center of the main cross bar and the diametric center of the sub-cross bar is a value obtained by subtracting a radius of the sub-cross bar from a radius of the main cross bar.

A longitudinal end of the sub-cross bar may be inserted into the main cross bar and disposed such that an outer circumferential surface of the sub-cross bar comes into contact with an inner circumferential surface of the main cross bar.

The center support bracket may include, to enclose a lower portion of the longitudinal end of the main cross bar in a "C"-shape, a center part and a side part bent from opposite sides of the center part, wherein the main lower flange and the sub-side flange are formed on an upper end of the center part, and the main bonding part may be formed on an upper end of the side part.

A welding hole may be formed in a portion of the longitudinal end of the main cross bar in which the sub-cross bar is inscribed, and the main cross bar and the sub-cross bar may be bonded to each other in the welding hole.

According to various aspects of the present invention, a cowl cross bar for a vehicle may include a main cross bar disposed in front of a driver's seat in a transverse direction of the vehicle, a sub-cross bar disposed in front of a passenger seat in the transverse direction of the vehicle, and a center supporter configured to couple the main cross bar and the sub-cross bar to each other such that diametric centers thereof are disposed eccentrically relative to each other, and the center supporter may include a main center support bracket fixed to an outer circumferential surface of a longitudinal end of the main cross bar, and provided with a connector to which a longitudinal end of the sub-cross bar is fixed, and a sub-center support bracket including an upper end fixed to the outer circumferential surface of the longitudinal end of the main cross bar, and a lower end fixed to the main center support bracket.

The main cross bar and the sub-cross bar may be disposed such that a sum of a radius of the main cross bar and a radius of the sub-cross bar may be less than a distance between the diametric center of the main cross bar and the diametric center of the sub-cross bar.

The main center support bracket may include, to have a "C"-shaped cross-sectional structure, a center part and a side part bent from opposite sides of the center part, in which a main lower flange may be provided on an upper end of the center part and fixed to the outer circumferential surface of the longitudinal end of the main cross bar, and a main bonding part may be provided on an upper end of the side part and fixed to the outer circumferential surface of the longitudinal end of the main cross bar.

The sub-center support bracket may be disposed at a position spaced apart from the center part by a predetermined distance in a longitudinal direction of the main cross bar, and the main cross bar, the main center support bracket and the sub-center support bracket may be coupled to each other in a closed cross-sectional structure.

An insert hole may be formed in the sub-center support bracket so that the longitudinal end of the sub-cross bar is fixed to the sub-center support bracket through the insert hole, and the longitudinal end of the sub-cross bar passes through the connector and is fixed thereto, and is inserted into the insert hole and fixed to the sub-center support bracket.

A bonding flange may be provided around the insert hole, and the longitudinal end of the sub-cross bar that is inserted into the insert hole may be enclosed by and fixed to the bonding flange.

The connector may protrudes in a conical shape from the sub-center support bracket, the longitudinal end of the sub-cross bar may have an expanded pipe shape, and the connector may be fixed to the longitudinal end of the sub-cross bar in a circumscribed state.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various embodiments of the present invention relate to a cowl cross bar in which a main cross bar disposed at one of left and right sides in a transverse direction of a vehicle and a sub-cross bar disposed at the other side are coupled to each other by a center supporter. In various embodiments of the present invention, the optimized stiffness depending on an eccentric rate between the main cross bar and the sub-cross bar can be secured by an improved coupling structure of the center supporter.

In the case of the cowl cross bar for a vehicle, eccentricity may be caused between the main cross bar and the sub-cross bar depending on a design taking into account the layout or the like of internal components (for example, an air vent, an AVN, etc.) of the vehicle. An eccentric rate may be changed to various values depending on the design.

Given this, the present invention proposes three types of coupling structures according to eccentric rates (diametric center eccentric rates) between the main cross bar that is disposed in front of a driver's seat in the transverse direction of the vehicle and the sub-cross bar that is disposed in front of a passenger seat in the transverse direction of the vehicle, whereby the optimized stiffness of the cowl cross bar can be effectively secured for each layout structure of the cowl cross bar.

Hereinafter, various embodiments of the present invention will be described in detail with reference to the accompanying drawings.

First Embodiment

Figure 1:
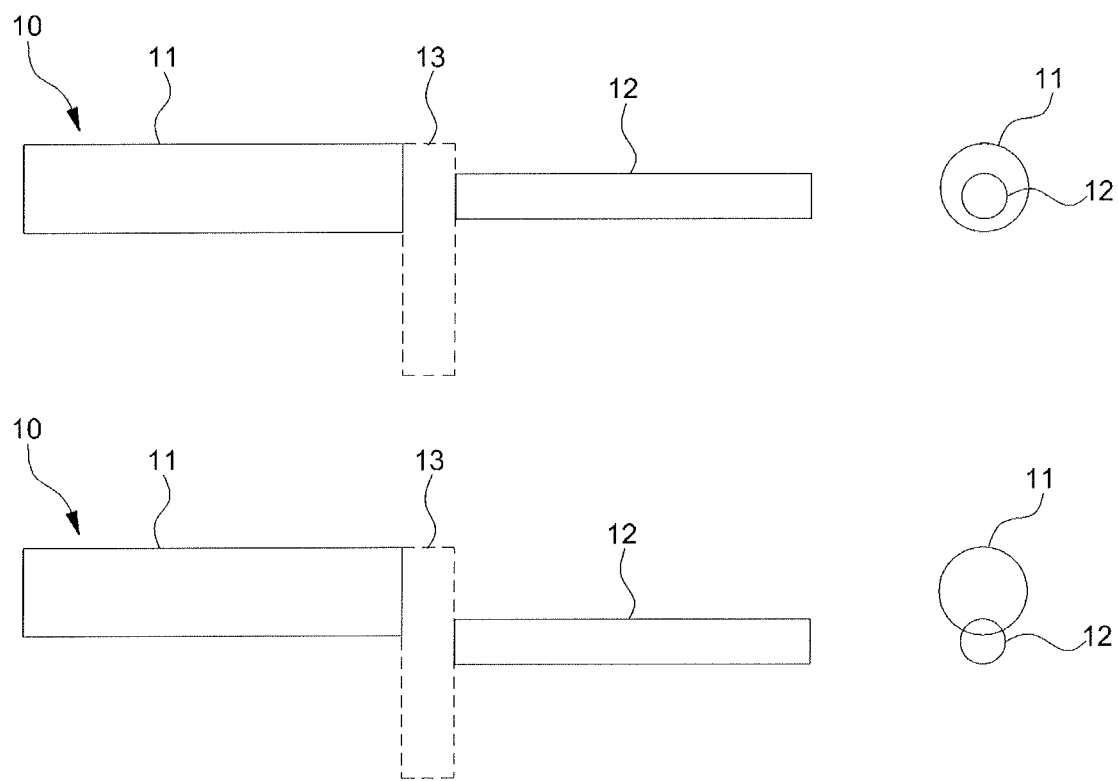
FIG. 1 is a schematic view illustrating a layout structure of a cowl cross bar provided with a center supporter according to various embodiments of the present invention.
Figure 2:
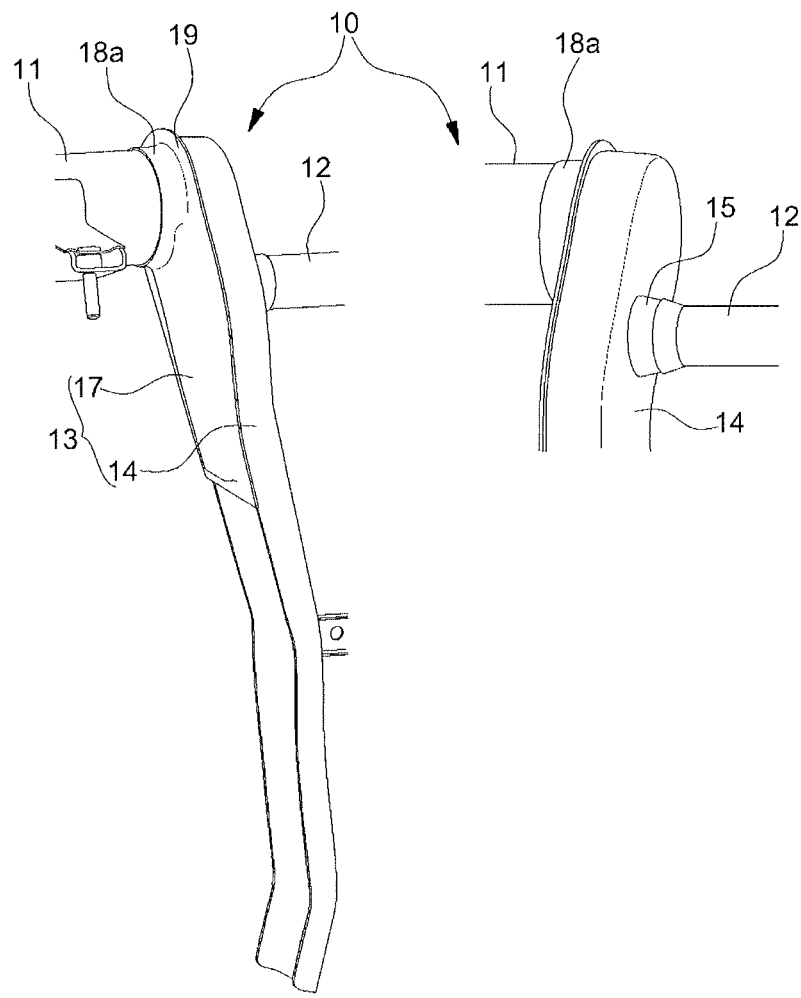
FIG. 2 is a partial perspective view illustrating the center supporter of the cowl cross bar according to various embodiments of the present invention.
Figure 3:
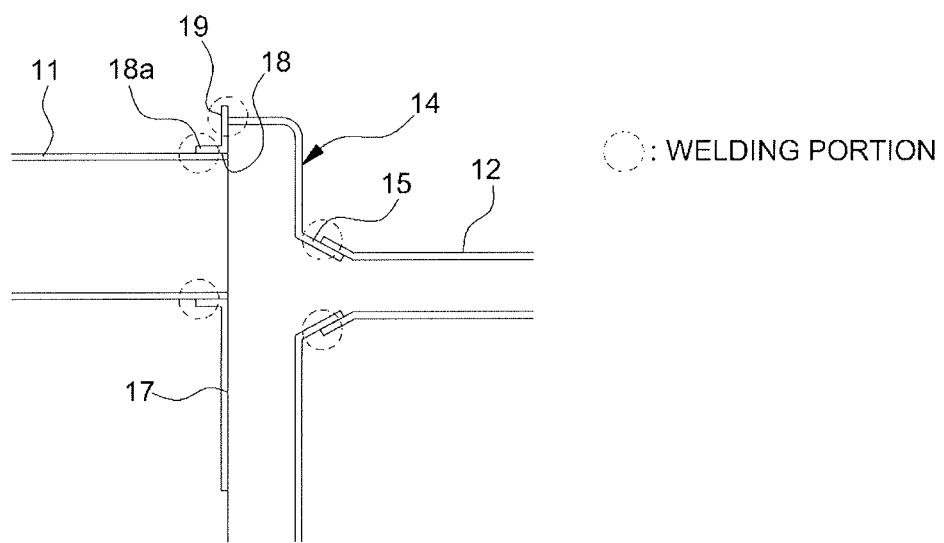
FIG. 3 is a sectional view illustrating the center supporter of the cowl cross bar according to various embodiments of the present invention.

In FIG. 1, there is illustrated a schematic layout structure of a cowl cross bar provided with a center supporter according to a first embodiment. In FIGS. 2 and 3, there is illustrated a detailed structure of the center supporter according to the first embodiment.

As shown in FIG. 1, in the cowl cross bar 10, a main cross bar 11 and a sub-cross bar 12 may be disposed such that the sum of the radius of the main cross bar 11 and the radius of the sub-cross bar 12 is less than the distance between a diametric center (that is, a circle center) of the main cross bar 11 and a diametric center of the sub-cross bar 12.

As such, the cowl cross bar 10 having the layout structure of the main cross bar 11 and the sub-cross bar 12 that are disposed such that the diametric centers thereof are positioned eccentrically relative to each other includes a center supporter 13, which has a structure shown in FIGS. 2 and 3 and is provided between the main cross bar 11 and the sub cross bar 12 so as to secure effective stiffness enhancement according to an eccentric rate.

Referring to FIGS. 2 and 3, the center supporter 13 includes a main center support bracket 14 to which one longitudinal end of the sub-cross bar 12 is fixed, and a sub-center support bracket 17 to which one longitudinal end of the main cross bar 11 is fixed.

The main center support bracket 14 is disposed to extend in a direction approximately perpendicular to the longitudinal direction of the main cross bar 11 and the sub-cross bar 12. A connector 15 is provided on an upper longitudinal end of the main center support bracket 14 so that the longitudinal end of the sub-cross bar 12 is fixed to and supported by the connector 15.

The connector 15 protrudes toward the sub-cross bar 12 from the upper end of the main center support bracket 14 that is disposed between the main cross bar 11 and the sub-cross bar 12. In this regard, the connector 15 protrudes in a conical shape in which the diameter thereof is gradually reduced in the transverse direction (or the protruding direction).

The longitudinal end of the sub-cross bar 12 that is fixed to the connector 15 has an expanded pipe shape in which the diameter thereof is gradually increased toward a distal end in the longitudinal direction.

The expanded-pipe-shaped longitudinal end of the sub-cross bar 12 is bonded to an outer circumferential surface of the conical connector 15 by welding. In other words, since the conical connector 15 is inserted into and bonded to the expanded-pipe-shaped longitudinal end of the sub-cross bar 12, the section modulus of the junction therebetween is increased, whereby the bending stiffness of the junction part of the sub-cross bar 12 coupled to the main cross bar 11 can be enhanced.

For example, an inclined angle of the junction surface between the conical connector 15 and the expanded-pipe-shaped longitudinal end of the sub-cross bar 12 may range from 30° to 60°.

Furthermore, the sub-center support bracket 17 is bonded to the upper end of the main center support bracket 14 by welding. An insert hole 18 is formed in the sub-center support bracket 17 so that the longitudinal end of the main cross bar 11 is supported by and fixed to the sub-center support bracket 17 through the insert hole 18.

In more detail, an edge of the main center support bracket 14 that has a cross-section structure bent to have a U-shape is bonded by welding to a sub-flange 19 formed on a peripheral part of the sub-center support bracket 17. The insert hole 18 is formed in an upper end of the sub-center support bracket 17 and, in detail, disposed over the connector 15 of the main center support bracket 14. That is, the insert hole 18 and the connector 15 are disposed to be stepped from each other.

A bonding flange 18a protruding toward the main cross bar 11 is provided around the insert hole 18. An outer circumferential surface of the longitudinal end of the main cross bar 11 that is inserted into the insert hole 18 is enclosed by and welded to the bonding flange 18a.

In the cowl cross bar 10 having the above structure in which the main cross bar 11 and the sub-cross bar 12 are coupled to each other, the bending stiffness which may be reduced due to the eccentricity between the main cross bar 11 and the sub-cross bar 12 can be reinforced. Therefore, the stiffness against a collision, vibration or the like can be enhanced, and the degree of freedom in designing the internal components for an interior design of the vehicle can be improved.

Second Embodiment

Figure 4:
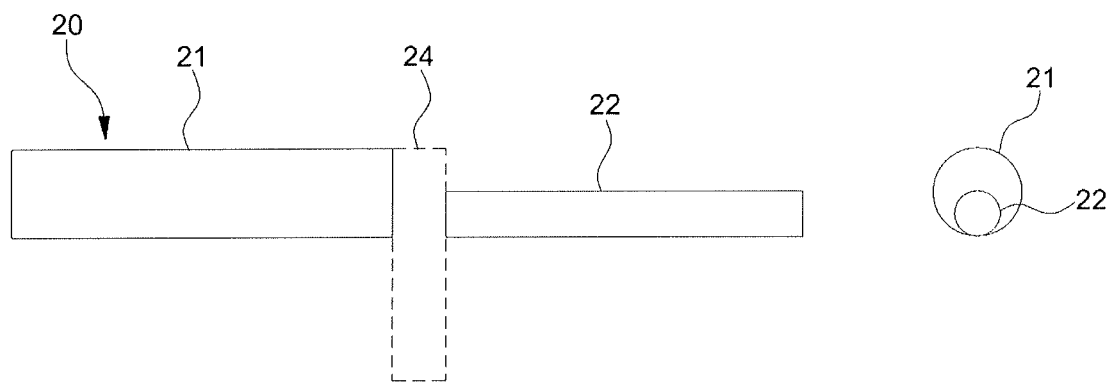
FIG. 4 is a schematic view illustrating a layout structure of a cowl cross bar provided with a center support bracket (center supporter) according to various embodiments of the present invention.
Figure 5A:
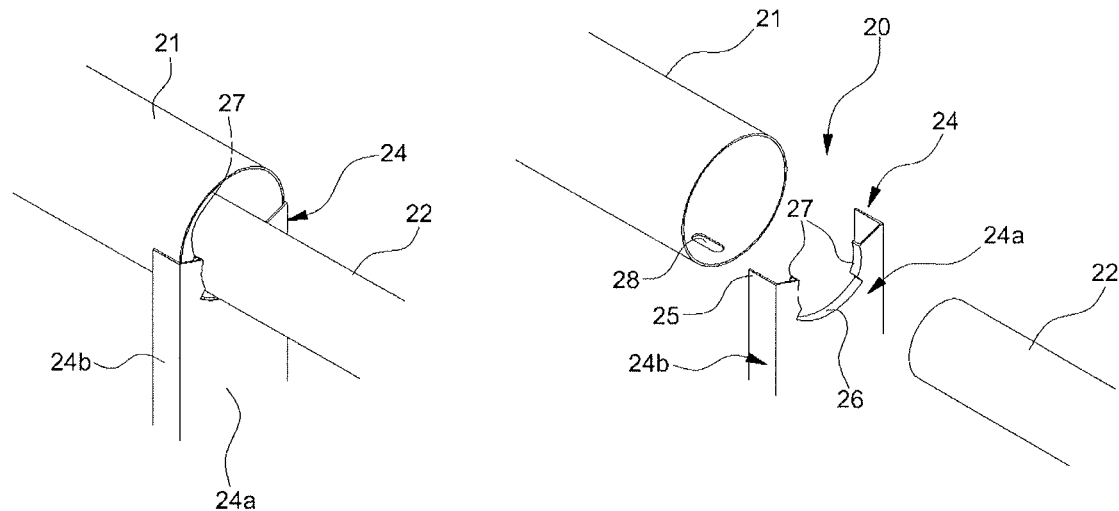
FIG. 5A and FIG. 5B are views illustrating a detailed structure and a coupling structure of the center support bracket of the cowl cross bar according to various embodiments of the present invention.
Figure 5B:
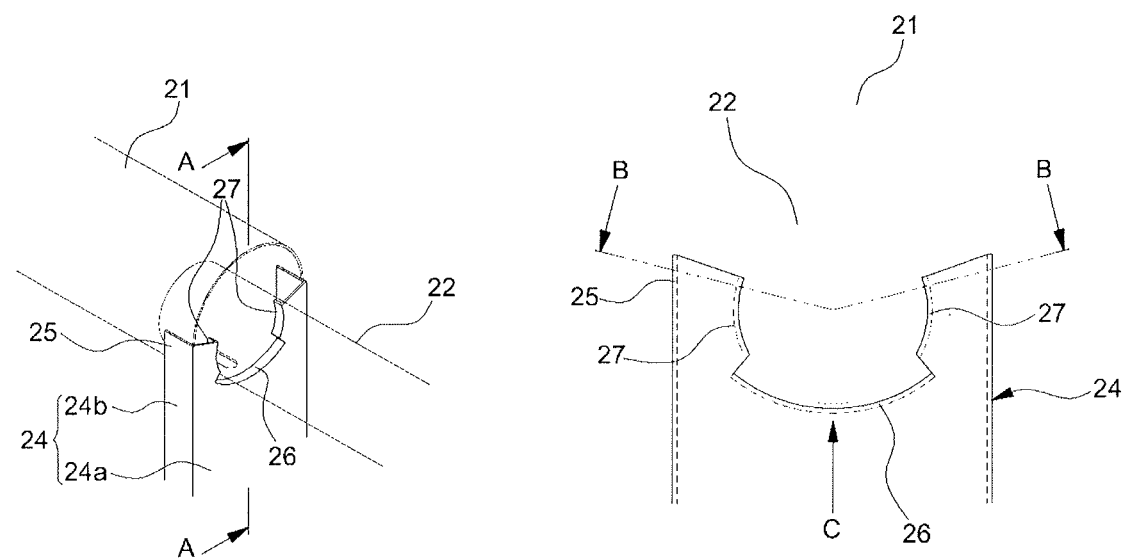
Figure 6:
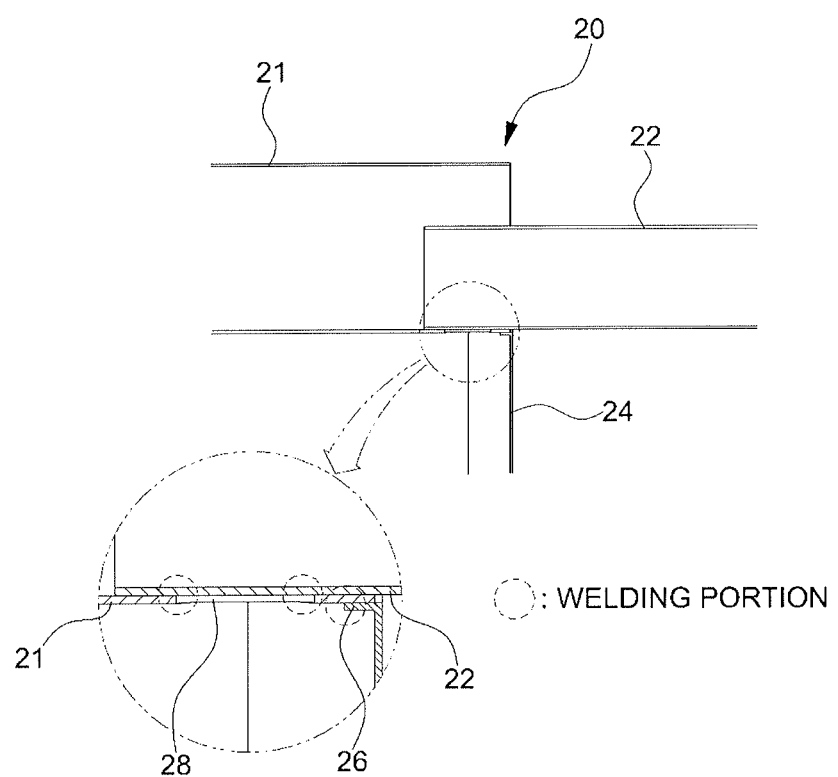
FIG. 6 is a sectional view taken along line A-A of FIG. 5B.
Figure 7:
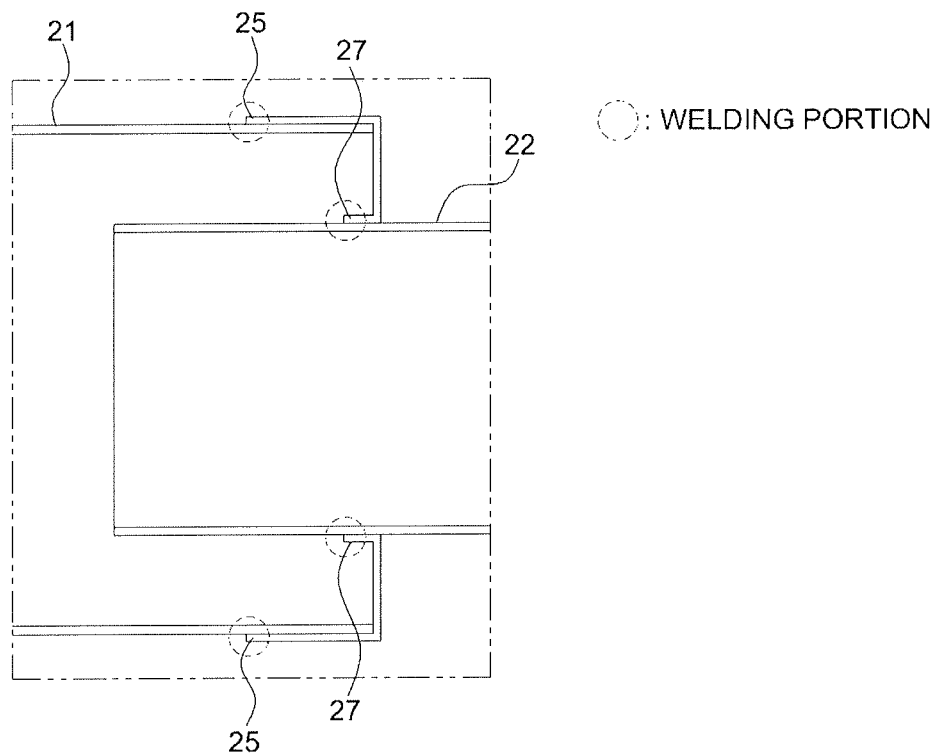
FIG. 7 is a sectional view taken along line B-B of FIG. 5B.

In FIG. 4, there is illustrated a schematic layout structure of a cowl cross bar provided with a center support bracket (center supporter) according to a second embodiment. In FIGS. 5A to 8, there are illustrated a detailed structure of the center support bracket and a coupling structure between a main cross bar and a sub-cross bar, according to the second embodiment.

Typically, the main cross bar has a diameter greater than that of the sub-cross bar. Therefore, as shown in FIG. 4, in the cowl cross bar 20, the main cross bar 21 and the sub-cross bar 22 may be disposed such that the distance between a diametric center of the main cross bar 21 and a diametric center of the sub-cross bar 22 is a value obtained by subtracting the radius of the sub-cross bar 22 from the radius of the main cross bar 21. For reference, the length of the sub-cross bar 22 is greater than that of the main cross bar 21.

As such, the cowl cross bar 20 having the layout structure of the main cross bar 21 and the sub-cross bar 22 that are disposed such that the diametric centers thereof are positioned eccentrically relative to each other may be configured such that the sub-cross bar 22 is inserted into and partially overlapped with the main cross bar 21 so as to enhance the stiffness of the junction between the main cross bar 21 and the sub-cross bar 22. In this case, to appropriately enhance the stiffness depending on an eccentric rate between the main cross bar 21 and the sub-cross bar 22, a center support bracket 24 having the configuration shown in FIGS. 5A to 8 is provided as the center supporter between the main cross bar 21 and the sub-cross bar 22.

Referring to FIGS. 5A to 8, one longitudinal end of the sub-cross bar 22 is inserted into and inscribed in one longitudinal end of the main cross bar 21. That is, an outer circumferential surface of the longitudinal end of the sub-cross bar 22 makes partial contact with an inner circumferential surface of the longitudinal end of the main cross bar 21.

The center support bracket 24 functions to couple the main cross bar 21 and the sub-cross bar 22 that are disposed such that the diametric centers thereof are positioned eccentrically relative to each other. The center support bracket 24 has a C ⊏-shaped cross-section, which encloses the longitudinal end of the main cross bar 21. Further, the center support bracket 24 is disposed to extend in a direction approximately perpendicular to the longitudinal direction of the main cross bar 21 and the sub-cross bar 22. Main bonding parts 25, a main lower flange 26 and sub-side flanges 27 are formed on an upper longitudinal end of the center support bracket 24 so as to support and fix the longitudinal ends of the main cross bar 21 and the sub-cross bar 22.

In detail, the center support bracket 24 includes, to enclose a lower portion of the longitudinal end of the main cross bar 21 in a U shape, a center part 24a and side parts 24b which are bent from opposite edges of the center part 24a. An upper end of the center part 24a comes into contact with the longitudinal end of the main cross bar 21. Upper ends of the side parts 24b come into contact with the outer circumferential surface of the main cross bar 21 and are bonded thereto by welding.

The main lower flange 26 which is fixed to the outer circumferential surface of the longitudinal end of the main cross bar 21, and the sub-side flanges 27 which are fixed to the outer circumferential surface of the longitudinal end of the sub-cross bar 22, are formed in the upper end of the center part 24a. The main bonding parts 25 which are fixed to the outer circumferential surface of the longitudinal end of the main cross bar 21 are provided in the upper ends of the respective opposite side parts 24b. In this regard, the main bonding parts 25 are provided as the upper distal ends of the respective side parts 24b.

In more detail, after the main bonding parts 25 and the main lower flange 26 have been bonded to the outer circumferential surface of the main cross bar 21, the sub-side flanges 27 are bonded to the outer circumferential surface of the sub-cross bar 22 by welding.

In this regard, on the basis of the front, rear, up and down directions of the vehicle, the main bonding parts 25 are fixed to approximately opposite front and rear portions of the outer circumferential surface of the main cross bar 21. The main lower flange 26 is fixed to a lower portion of the outer circumferential surface of the main cross bar 21. The sub-side flanges 27 are fixed to approximately opposite front and rear portions of the outer circumferential surface of the sub-cross bar 22.

Figure 8:
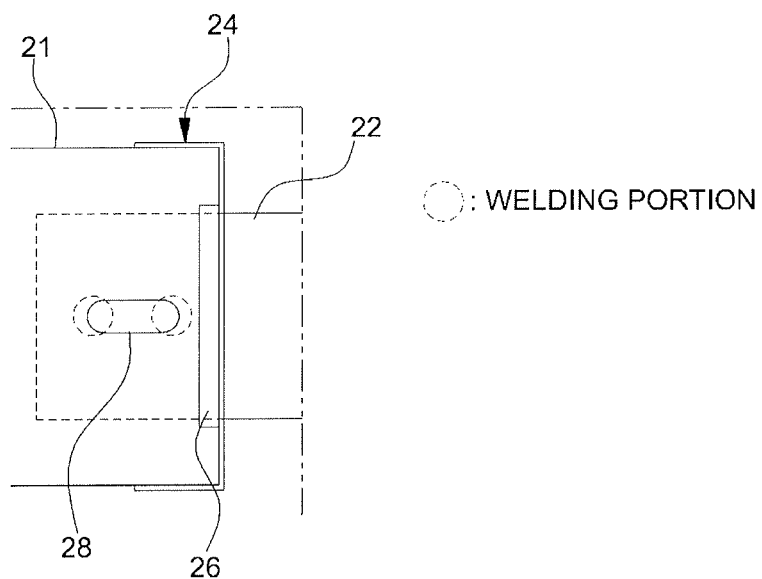
FIG. 8 is a bottom view seen from the direction designated by the arrow C of FIG. 5B.

Furthermore, referring to FIG. 8, a welding hole 28 to be used for welding of the sub-cross bar 22 is formed in a lower portion of the main cross bar 21 in which the sub-cross bar 22 is inscribed. The main cross bar 21 and the sub-cross bar 22 can be more reliably bonded to each other through the welding hole 28.

Due to the above-mentioned coupling structure between the main cross bar 21 and the sub-cross bar 22, the stiffness of the cowl cross bar 20 which may be reduced because of the eccentricity between the main cross bar 21 and the sub-cross bar 22 can be effectively reinforced. Therefore, the stiffness of the cowl cross bar 20 against a collision, vibration or the like can be secured, and the degree of freedom in designing the internal components for an interior design of the vehicle can be enhanced.

Third Embodiment

Figure 9:
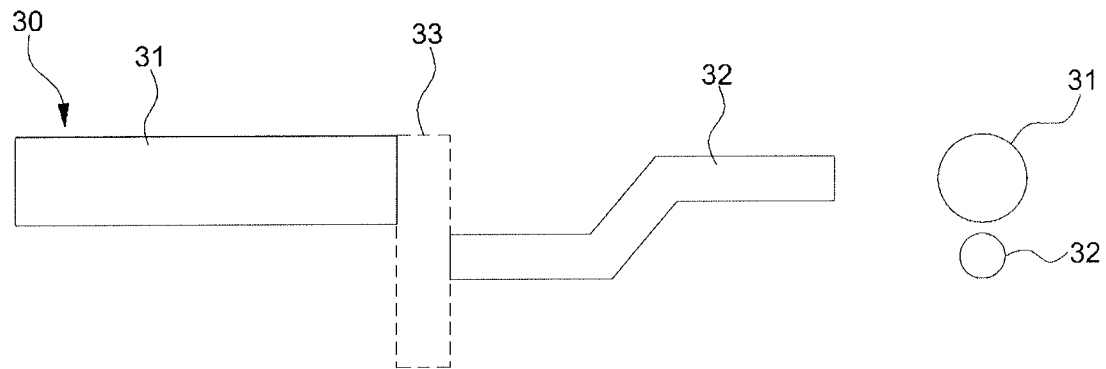
FIG. 9 is a schematic view illustrating a layout structure of a cowl cross bar provided with a center supporter according to various embodiments of the present invention.
Figure 10:
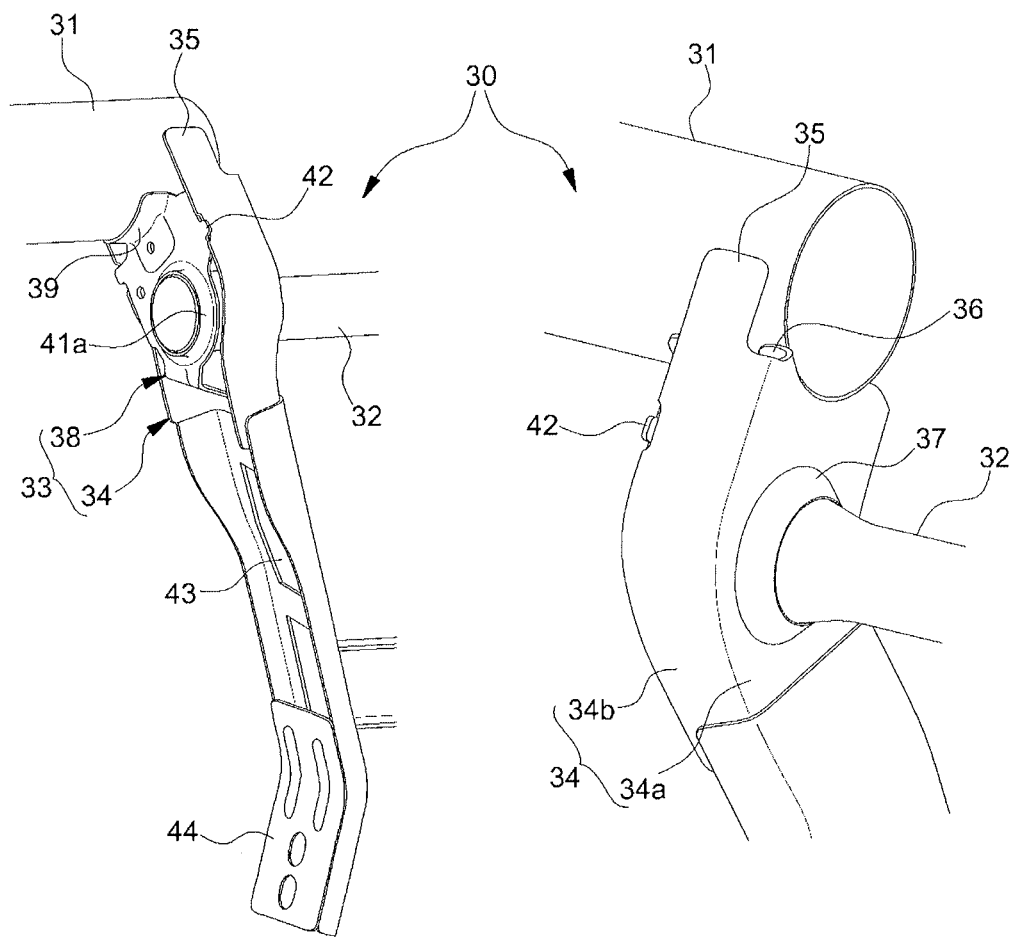
FIG. 10 is a perspective view illustrating the center supporter of the cowl cross bar according to various embodiments of the present invention.
Figure 11:
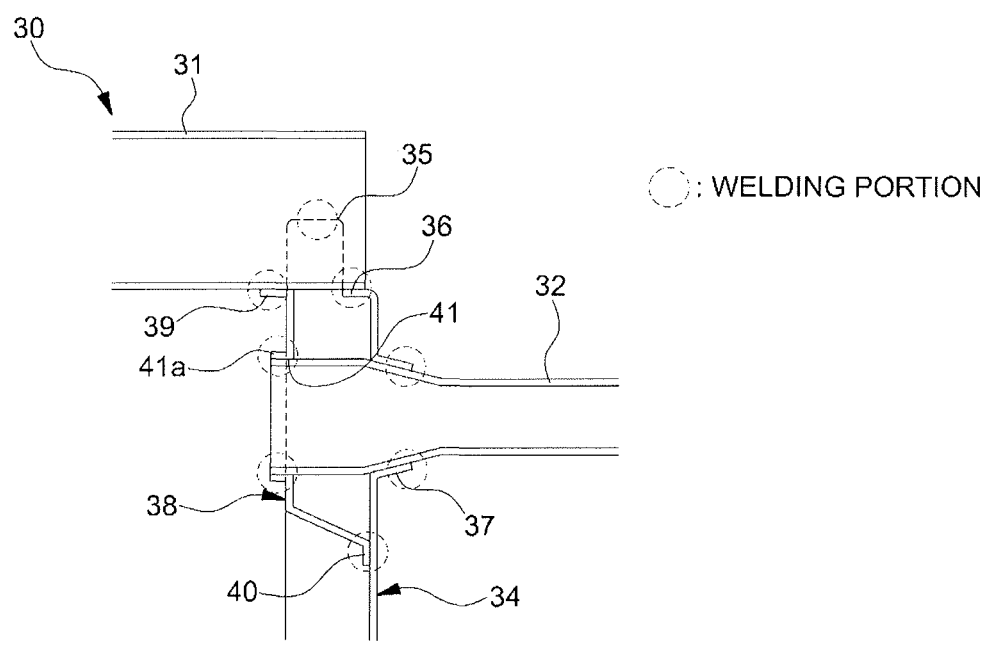
FIG. 11 is a sectional view illustrating the center supporter of the cowl cross bar according to various embodiments of the present invention.

In FIG. 9, there is illustrated a schematic layout structure of a cowl cross bar provided with a center supporter according to a third embodiment. In FIGS. 10 and 11, there are illustrated a detailed structure of the center supporter and a coupling structure between the main cross bar and a sub-cross bar, according to the third embodiment.

As shown in FIG. 9, in the cowl cross bar 30, a main cross bar 31 and a sub-cross bar 32 may be disposed such that the sum of the radius of the main cross bar 31 and the radius of the sub-cross bar 32 is less than the distance between a diametric center of the main cross bar 31 and a diametric center of the sub-cross bar 32.

As such, in the case of the cowl cross bar 30 having the layout structure of the main cross bar 31 and the sub-cross bar 32 that are disposed such that the diametric centers thereof are positioned eccentrically from each other, a center supporter 33 which has a structure shown in FIGS. 10 and 11 is provided between the main cross bar 31 and the sub cross bar 32 so as to provide optimal stiffness enhancement according to an eccentric rate.

Referring to FIGS. 10 and 11, the center supporter 33 includes a main center support bracket 34 and a sub-center support bracket 38.

The main center support bracket 34 is disposed to extend in a direction approximately perpendicular to the longitudinal direction of the main cross bar 31 and the sub-cross bar 32. The main center support bracket 34 is fixed to an outer circumferential surface of one longitudinal end of the main cross bar 31 by welding.

For this, main bonding parts 35 and a main lower flange 36 which are fixed to the longitudinal end of the main cross bar 31 are provided in an upper longitudinal end of the main center support bracket 34. In detail, the main center support bracket 34 includes a center part 34a and side parts 34b which are bent from opposite transverse side edges of the center part 34a, and thus generally has a ⊏-shaped (C-shaped) cross-sectional structure. The main lower flange 36 is formed in an upper end of the center part 34a. The main bonding parts 35, each of which extends longer than the center part 34a, are provided on upper ends of the respective side parts 34b.

In the main center support bracket 34 having the above-mentioned configuration, on the basis of the front, rear, up and down directions of the vehicle, the main bonding part 35 is bonded to approximately opposite front and rear portions of the outer circumferential surface of the main cross bar 31 by welding. The main lower flange 36 is bonded to a lower portion of the outer circumferential surface of the main cross bar 31 by welding.

Furthermore, a connector 37 is provided on the center part 34a of the main center support bracket 34 so that one longitudinal end of the sub-cross bar 32 is supported on and fixed to the connector 37.

The connector 37 protrudes toward the sub-cross bar 32 from the upper end of the center part 34a of the main center support bracket 34 that is disposed between the main cross bar 31 and the sub-cross bar 32. In this regard, the connector 37 has a conical shape in which the diameter thereof is gradually reduced in the protruding direction (that is, in the longitudinal direction of the sub-cross bar).

The longitudinal end of the sub-cross bar 32 fixed to the connector 37 has an expanded pipe shape in which the diameter thereof is gradually increased toward a distal end in the longitudinal direction.

The expanded-pipe-shaped longitudinal end of the sub-cross bar 32 is inserted into the conical connector 37 and fixed thereto by welding in a circumscribed state. In other words, an inner circumferential surface of the conical connector 37 is bonded to an outer circumferential surface of the expanded-pipe-shaped longitudinal end of the sub-cross bar 32. Thus, the section modulus of the junction therebetween is increased, whereby the bending stiffness of the junction part of the sub-cross bar 32 coupled to the main cross bar 31 can be enhanced.

Furthermore, the expanded-pipe-shaped longitudinal end of the sub-cross bar 32 passes through the sub-center support bracket 38 and then is fixed to the sub-center support bracket 38 by welding. Thus, the bending stiffness of the junction part of the sub-cross bar 32 can be further enhanced.

The sub-center support bracket 38 is fixed between the longitudinal end of the main cross bar 31 and the main center support bracket 34 by welding. A sub-upper flange 39 provided in the upper end of the sub-center support bracket 38 is bonded to a lower portion of the outer circumferential surface of the longitudinal end of the main cross bar 31. A sub-lower flange 40 provided in a lower end of the sub-center support bracket 38 is bonded to an upper end (in detail, below the junction part) of the main center support bracket 34. An insert hole 41 is formed in the sub-center support bracket 38 between the sub-upper flange 39 and the sub-lower flange 40 so that the expanded-pipe-shaped longitudinal end of the sub-cross bar 32 is supported by the sub-center support bracket 38 through the insert hole 41.

A bonding flange 41a protruding toward the main cross bar 31 is provided around the insert hole 41. The expanded-pipe-shaped longitudinal end of the sub-cross bar 32, which passes through the insert hole 41 and is supported by the sub-center support bracket 38, is enclosed by the bonding flange 41a and bonded thereto by welding.

As such, the expanded-pipe-shaped longitudinal end of the sub-cross bar 32 not only passes through the connector 37 of the main center support bracket 34 and is bonded thereto but also passes through the insert hole 41 of the sub-center support bracket 38 and is bonded to the sub-center support bracket 38. Thus, the stiffness of the junction part of the sub-cross bar 32 coupled to the main cross bar 31 can be further enhanced.

As shown in FIG. 11, in the longitudinal end of the sub-cross bar 32, only a portion thereof that is welded to the connector of the main center support bracket 34 has an expanded pipe shape, and a portion thereof that is fitted into the insert hole 41 of the sub-center support bracket 38 may have a normal pipe shape (not expanded-pipe shape).

Furthermore, as stated above, the sub-center support bracket 38 is welded to and fixed between the main cross bar 31 and the main center support bracket 34 through the sub-upper flange 39 and the sub-lower flange 40. In this regard, the sub-center support bracket 38 is disposed at a position spaced apart from the center part 34a of the main center support bracket 34 in the longitudinal direction of the main cross bar 31. Therefore, the main cross bar 31, the main center support bracket 34 and the sub-center support bracket 38 are coupled to one another to have a closed cross-sectional structure, whereby the bending stiffness of the cowl cross bar 30 can be further enhanced.

Furthermore, the sub-center support bracket 38 includes support flanges 42 on respective opposite side edges thereof in the transverse direction. The support flanges 42 are seated on and bonded to edges of the respective side parts 34b of the main center support bracket 34.

In the main cross bar 31 and the sub-cross bar 32 that are coupled to each other in the above-mentioned structure, the bending stiffness which is reduced due to the eccentricity between the main cross bar 31 and the sub-cross bar 32 can be enhanced. Therefore, the stiffness of the cowl cross bar 30 against a collision, vibration or the like can be secured, and the degree of freedom in designing the internal components for an interior design of the vehicle can be enhanced.

Meanwhile, the center supporter 33 may be manufactured by die-casting a magnesium material or pressing a steel material.

Furthermore, in the case of the main center support bracket 34, so as to reduce the weight thereof, a weight reducing hole 43 may be formed in a region in which the significance of the stiffness is relatively low. A separate reinforcing plate 44 may be provided on a region in which the significance of the stiffness is relatively high. For example, the reinforcing plate 44 may be disposed on a lower end of the main center support bracket 34 (refer to FIG. 10).

Although not shown in the drawings, the cowl cross bar 30 is configured such that each of the other longitudinal ends of the main cross bar 31 and the sub-cross bar 32 is supported by and coupled to the vehicle body, and the cowl cross bar 30 is also supported by and coupled to the vehicle body by a cowl bracket (not shown) coupled to the outer circumferential surface of the main cross bar 31.

In a cowl cross bar for a vehicle according to various embodiments of the present invention, the optimal coupling structure between a main cross bar and a sub-cross bar is embodied depending on an eccentric rate between the main cross bar and the sub-cross bar, whereby the stiffness of the cowl cross bar can be effectively enhanced.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cowl cross bar for a vehicle comprising a main cross bar disposed in front of a driver's seat in a transverse direction of the vehicle, a sub-cross bar disposed in front of a passenger seat in the transverse direction of the vehicle, and a center supporter configured to couple the main cross bar and the sub-cross bar to each other such that diametric centers thereof are disposed eccentrically relative to each other, the center supporter comprising:
  a main center support bracket fixed to an outer circumferential surface of a longitudinal end of the main cross bar, and provided with a connector to which a longitudinal end of the sub-cross bar is fixed; and
  a sub-center support bracket including an upper end fixed to the outer circumferential surface of the longitudinal end of the main cross bar, and a lower end fixed to the main center support bracket.

2. The cowl cross bar for the vehicle of claim 1, wherein the main cross bar and the sub-cross bar are disposed such that a sum of a radius of the main cross bar and a radius of the sub-cross bar is less than a distance between the diametric center of the main cross bar and the diametric center of the sub-cross bar.

3. The cowl cross bar for the vehicle of claim 1, wherein the main center support bracket comprises, to have a "C"-shaped cross-sectional structure, a center part and a side part bent from opposite sides of the center part, wherein a main lower flange is provided on an upper end of the center part and fixed to the outer circumferential surface of the longitudinal end of the main cross bar, and a main bonding part is provided on an upper end of the side part and fixed to the outer circumferential surface of the longitudinal end of the main cross bar.

4. The cowl cross bar for the vehicle of claim 3, wherein the sub-center support bracket is disposed at a position spaced apart from the center part by a predetermined distance in a longitudinal direction of the main cross bar, and the main cross bar, the main center support bracket and the sub-center support bracket are coupled to each other in a closed cross-sectional structure.

5. The cowl cross bar for the vehicle of claim 1, wherein an insert hole is formed in the sub-center support bracket so that the longitudinal end of the sub-cross bar is fixed to the sub-center support bracket through the insert hole, and the longitudinal end of the sub-cross bar passes through the connector and is fixed thereto, and is inserted into the insert hole and fixed to the sub-center support bracket.

6. The cowl cross bar for the vehicle of claim 5, wherein a bonding flange is provided around the insert hole, and the longitudinal end of the sub-cross bar that is inserted into the insert hole is enclosed by and fixed to the bonding flange.

7. The cowl cross bar for the vehicle of claim 1, wherein the connector protrudes in a conical shape from the sub-center support bracket, the longitudinal end of the sub-cross bar has an expanded pipe shape, and the connector is fixed to the longitudinal end of the sub-cross bar in a circumscribed state.

* * * * *